United States Patent
HomChaudhuri et al.

(10) Patent No.: US 9,628,166 B2
(45) Date of Patent: Apr. 18, 2017

(54) SHARED ANTENNA LOSS DETECTION AND RECOVERY

(71) Applicant: QUALCOMM Incorporated, San Diego, CA (US)

(72) Inventors: Sandip HomChaudhuri, San Jose, CA (US); Gangadhar Burra, Fremont, CA (US); Alireza Raissinia, Monte Sereno, CA (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 14/678,753

(22) Filed: Apr. 3, 2015

(65) Prior Publication Data

US 2016/0294464 A1 Oct. 6, 2016

(51) Int. Cl.
*H04B 7/08* (2006.01)
*H04W 24/04* (2009.01)
*H04B 7/00* (2006.01)
*H04L 1/00* (2006.01)

(52) U.S. Cl.
CPC ............. *H04B 7/0857* (2013.01); *H04L 1/00* (2013.01); *H04W 24/04* (2013.01)

(58) Field of Classification Search
CPC .......... H04B 1/406; H04B 7/00; H04B 1/403; H04W 88/06; H04W 4/008; H04W 84/12
See application file for complete search history.

(56) References Cited

U.S. PATENT DOCUMENTS

| 7,046,649 | B2 * | 5/2006 | Awater | H04W 16/14 370/338 |
| 7,283,840 | B2 * | 10/2007 | Cho | H04B 1/406 330/100 |
| 8,150,454 | B2 | 4/2012 | Sanders | |
| 8,265,017 | B2 * | 9/2012 | Robinson | H04W 16/14 370/328 |
| 8,755,359 | B2 | 6/2014 | Faber | |
| 8,761,296 | B2 | 6/2014 | Zhang et al. | |

(Continued)

OTHER PUBLICATIONS

ISA/EP, International Search Report and Written Opinion of the International Searching Authority, Int'l. App. No. PCT/US2016/025249, Jun. 2, 2016, European Patent Office, Rijswijk, NL, 12 pgs.

*Primary Examiner* — Pablo Tran
(74) *Attorney, Agent, or Firm* — Holland & Hart LLP

(57) ABSTRACT

Methods, systems, and devices are described for wireless communication at a wireless communications device. The device may use several antennas to receive a signal, one of which may be shared between two radios. During signal reception, a radio may detect when the shared antenna is abruptly taken over by the other radio. The radio may detect the loss of the antenna by measuring an impedance mismatch. Alternatively, the radio may reference an antenna switch control that is used to facilitate the switch. After detection, the radio may recover from the antenna loss by adjusting signal processing. For example, the radio may modify a maximal ratio combining (MRC) operation. In certain examples, the device may disregard the signal version from the shared antenna in the computation of MRC weights. In some cases, the device may interrupt an MRC weight computation and use MRC weights from a previous calculation.

27 Claims, 12 Drawing Sheets

(56) References Cited

U.S. PATENT DOCUMENTS

| | | | | |
|---|---|---|---|---|
| 8,873,418 B2* | 10/2014 | Robinson | ............... | H04W 16/14 370/252 |
| 2002/0057726 A1* | 5/2002 | Williams | ............. | H04B 1/7101 375/136 |
| 2003/0098806 A1* | 5/2003 | Green | ...................... | H03D 7/16 341/144 |
| 2004/0022210 A1* | 2/2004 | Frank | .................... | H04W 88/02 370/328 |
| 2004/0180622 A1* | 9/2004 | Godfrey | ................ | H04W 88/06 455/41.2 |
| 2005/0208900 A1* | 9/2005 | Karacaoglu | ............ | H04B 1/406 455/78 |
| 2007/0060055 A1 | 3/2007 | Desai et al. | | |
| 2012/0046000 A1 | 2/2012 | Gao et al. | | |
| 2012/0329395 A1 | 12/2012 | Husted et al. | | |
| 2013/0143494 A1 | 6/2013 | Chen et al. | | |
| 2014/0235260 A1 | 8/2014 | Zawaideh et al. | | |

* cited by examiner

SHARED ANTENNA LOSS DETECTION AND RECOVERY

BACKGROUND

Field of Disclosure

The following relates generally to wireless communication, and more specifically to shared antenna loss detection and recovery.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power).

A wireless network, for example a wireless local area network (WLAN), such as Wi-Fi network may include an access point (AP) that may communicate with one or more station (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink (DL) and UL. From the point of view of the STA, the DL (or forward link) may refer to the communication link from the AP to the station, and the uplink (UL) (or reverse link) may refer to the communication link from the station to the AP. In some cases, the AP may support more than one wireless technology (e.g., the AP may also support cellular communications). Additionally or alternatively, a communication device may be located in a heterogeneous network in which more than one radio access technology is available for communications.

Accordingly, some wireless communication devices may be equipped to support multiple wireless communications types over more than one radio using a number of antennas. An antenna may be dedicated to (i.e., exclusively used by) a single radio, or shared between two radios. However, a shared antenna is generally connected to a single radio at a time. In some cases, a first radio may be receiving a signal over the shared antenna when a second radio takes control of the antenna. In such cases, there may be a delay between the loss of the shared antenna and detection of the loss by the first radio. Accordingly, the first radio may continue to process received signals without adjusting for the loss of the shared antenna, which may decrease the quality of a reconstructed signal and impair system performance.

SUMMARY

Systems, methods, and apparatuses for shared antenna loss detection and recovery are described. In a wireless communication system, a first radio of a dual-radio device may receive several redundant versions of the same signal over a number of antennas, one of which may be shared between the two radios. During signal reception, the first radio may detect when the second radio abruptly takes control of the shared antenna. The loss of the shared antenna at the first radio may result in a hardware event detectable by the first radio, such as an impedance mismatch (e.g., the disconnected antenna port may look like an open circuit) or a changed state of antenna switch control. Upon detecting this hardware event, the first radio may recover from the antenna loss by adjusting receive-side processing of the signal. One way that the first radio may adjust the receive-side signal processing of the signal is through a modification of a maximal ratio combining (MRC) operation. For example, the first radio may disregard the signal version from the shared antenna in the computation of MRC weights. Alternatively, the first radio may interrupt an MRC weight computation and use an MRC weight from a previous calculation. The selection of MRC weights may be based at least in part on signal strength, time elapsed since the last successful MRC calculation, or channel coherence.

A method of wireless communication is described. The method may include receiving a first version of a signal using a first antenna, receiving a second version of the signal using a second antenna, wherein the second antenna is shared between a first radio and a second radio, detecting, by the first radio, a loss of access to the second antenna based at least in part on a hardware event, and modifying, by the first radio, receive-side processing of the first version of the signal and the second version of the signal based at least in part on the loss of access to the second antenna.

An apparatus for wireless communication is described. The apparatus may include an antenna measurement manager for receiving a first version of a signal using a first antenna and receiving a second version of the signal using a second antenna, wherein the second antenna is shared between a first radio and a second radio. The apparatus may include a hardware event monitor for detecting, by the first radio, a loss of access to the second antenna based at least in part on a hardware event. The apparatus may include a receive-side processing manager for modifying, by the first radio, receive-side processing of the first version of the signal and the second version of the signal based at least in part on the loss of access to the second antenna.

A further apparatus for wireless communication is described. The apparatus may include means for receiving a first version of a signal using a first antenna, means for receiving a second version of the signal using a second antenna, wherein the second antenna is shared between a first radio and a second radio, means for detecting, by the first radio, a loss of access to the second antenna based at least in part on a hardware event, and means for modifying, by the first radio, receive-side processing of the first version of the signal and the second version of the signal based at least in part on the loss of access to the second antenna.

A non-transitory computer-readable medium storing code for wireless communication is described. The code may include instructions executable to receive a first version of a signal using a first antenna, receive a second version of the signal using a second antenna, wherein the second antenna is shared between a first radio and a second radio, detect, by the first radio, a loss of access to the second antenna based at least in part on a hardware event, and modify, by the first radio, receive-side processing of the first version of the signal and the second version of the signal based at least in part on the loss of access to the second antenna.

The method or apparatuses described above may further include processes, features, means, or instructions for detecting the loss of access to the second antenna includes detecting an impedance mismatch associated with the second antenna. Additionally or alternatively, in some examples detecting the loss of access to the second antenna includes detecting a change in an antenna switch control associated with the second antenna.

Modifying the receive-side processing may include interrupting a maximal ratio combining (MRC) weight computation for the first antenna and the second antenna. Additionally or alternatively, in some examples modifying the receive-side processing includes modifying a maximal ratio combining (MRC) weight associated with one of the antennas. Modifying the MRC weight associated with one of the antennas may include assigning no MRC weight to the second antenna. Modifying the MRC weight associated with one of the antennas may include refraining from using the second version of the signal during an MRC equalization of the signal. Additionally or alternatively, in some examples modifying the receive-side processing includes using a stored MRC weight associated with a previously completed MRC weight computation in connection with the first version of the signal or the second version of the signal during an MRC equalization of the signal.

The previously completed MRC weight computation may be completed prior to the loss of access to the second antenna. Additionally or alternatively, some examples may include processes, features, means, or instructions for determining whether an elapsed amount of time since the most recently completed MRC weight computation or a channel condition satisfies a threshold wherein the use of the stored MRC weight is based at least in part on the determination.

The method or apparatuses described above may further include processes, features, means, or instructions for determining a first channel weight for the first antenna based at least in part on instantaneous measurements at the first antenna, performing the MRC equalization of the signal using the first channel weight for the first version of the signal and the stored channel weight from the previously completed MRC weight computation for the second version of the signal, and measuring a signal strength of at least one of the versions of the signal, wherein modifying the receive-side processing is based at least in part on the measured signal strength. Additionally or alternatively, in some examples the loss of access to the second antenna occurs during a receive operation of the first radio using the first and second antennas.

The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

A first radio of a multiple-radio wireless communications device may recognize a hardware event indicative of a second radio taking control of a shared antenna mid-reception, and compensate for the loss of the shared antenna by altering receive-side signal processing. The hardware event indicating the loss of the shared antenna may be, for example, an antenna impedance mismatch or a change in an antenna switch control. The modification to receive-side processing may include signal processing adjustments for recovery from instantaneous MRC shut-off that may result from sudden antenna removal. For example, the first radio may determine MRC (maximal ratio combining) weights for a signal after losing access to the shared antenna even if an MRC computation has been interrupted, or if the MRC computation been completed but is contaminated with meaningless inputs from the disconnected shared antenna port. These and other aspects of the disclosure are illustrated by and described with reference to apparatus diagrams, system diagrams, and flowcharts associated with shared antenna loss detection and recovery techniques.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
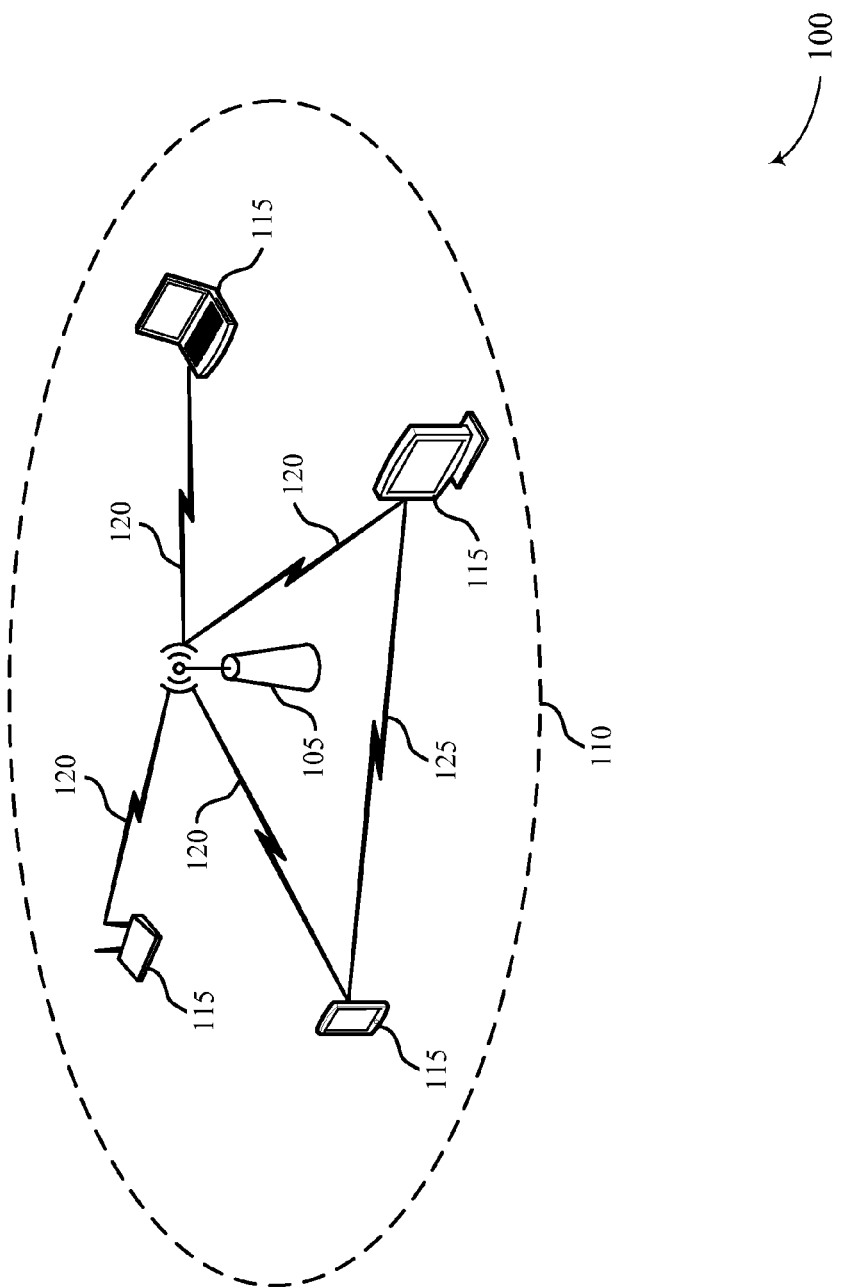
FIG. 1 illustrates a wireless local area network (WLAN) for shared antenna loss detection and recovery configured in accordance with various aspects of the present disclosure

FIG. 1 illustrates a WLAN 100 (also known as a Wi-Fi network) configured in accordance with various aspects of the present disclosure. The WLAN 100 may include an access point (AP) 105 and multiple associated STAs 115, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated STAs 115 may represent a basic service set (BSS) or an extended service set (ESS). The various STAs 115 in the network are able to communicate with one another through the AP 105. Also shown is a coverage area 110 of the AP 105, which may represent a basic service area (BSA) of the WLAN 100. An extended network station (not shown) associated with the WLAN 100 may be connected to a wired or wireless distribution system (DS) that may allow multiple APs 105 to be connected in an ESS.

A single AP 105 and an associated set of STAs 115 may be referred to as a BSS. An ESS is a set of connected BSSs. A distribution system (DS) (not shown) may be used to connect APs 105 in an ESS. In some cases, the coverage area 110 of an AP 105 may be divided into sectors (also not shown). The WLAN 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical (PHY) and medium access control (MAC) layers from IEEE 802.11 and versions including, but not limited to, 802.11b, 802.11g, 802.11a, 802.11n, 802.11ac, 802.11ad, 802.11ah, etc. In other implementations, peer-to-peer connections or ad hoc networks may be implemented within WLAN 100.

Although not shown in FIG. 1, a STA 115 may be located in the intersection of more than one coverage area 110 and may associate with more than one AP 105. In some cases, the STA 115 may be located at the intersection of service providers that support different radio technologies. For example, a STA 115 may be within the coverage area of a cellular base station (not shown) and a WLAN AP 105. The cellular base station may support various kinds of wireless communications, including Long Term Evolution (LTE).

In some instances an individual STA 115 may support more than one radio access technology (RAT). For example, a STA 115 may include multiple radios, each of which is associated with a different RAT. Each radio may be associated with one or more antennas, including antennas that are shared between the radios. A shared antenna may serve more than one radio by switching an electrical connection from one of the radios to the other of the radios.

In some cases, there may be a communication conflict in which two radios are scheduled to communicate at the same time. For example, one radio (the aggressor) may wish to use the shared antenna while the shared antenna is currently being used to receive a signal for another radio (the victim). In such instances, the aggressor radio may asynchronously, forcibly remove, or "yank", the shared antenna from the victim radio. However, such a technique may trigger meaningless inputs on the shared antenna port, which if used may corrupt receive-side signal processing (e.g., an MRC computation may be contaminated). Additionally, there may be abrupt data loss if the victim radio is in the process of receiving. In some cases, the incorporation of meaningless inputs into the receive-side processing may be avoided by the aggressor radio signaling (e.g., via a software message) the intent to remove the shared antenna from the victim radio, thus allowing the victim radio to take precautionary or preventative measures. However, sending a message from one radio to another (e.g., between two discrete processors) may introduce latency that may prevent fast antenna sharing. Furthermore, signaling intent may wake up the victim radio and its associated system and software (e.g., from delivery traffic indication map (DTIM) low power mode), which may increase power consumption. Thus, the victim radio may utilize hardware detection for rapid and power-saving detection of an antenna loss.

A STA 115 may be configured to collaboratively communicate with an AP 105 via multiple input multiple output (MIMO) techniques which use multiple antennas on the APs or multiple antennas on the STA to take advantage of multipath environments to transmit multiple data streams. Thus, a STA 115 may receive slightly different versions of the same information bearing signal according to the propagation path taken by each redundant version, or copy, of the signal. Each copy may experience different channel effects, such as fading or attenuation. A STA 115 may weight each version appropriately and combine the weighted versions to increase signal quality. For example, a STA 115 may implement maximal ratio combining (MRC) to compute the equalization weights for a signal.

An MRC computation may rely on signal measurements, such as signal strength and phase, to determine the weights for each signal version. However, if an antenna is abruptly disconnected, the measurements fed to the MRC computation block for that antenna may represent noise. Accordingly, the MRC computation for that antenna may be corrupted if the computation continues and uses the meaningless measurements. In some cases, an MRC computation may be shut-off mid process (e.g., if a shared antenna loss is detected). In such instances, the MRC block may not provide antenna weights for each version of the signal, which may impair or inhibit equalization of the signal. Thus, a victim radio of a STA 115 may implement MRC weight selection schemes which accommodate sudden loss of viable MRC weights. For instance, the victim radio may use MRC weights which have been previously calculated and stored in memory. In another example, the victim radio may decide to forego diversity and apply channel weights to the connected channels while neglecting the disconnected antenna.

In summary, a dual-radio STA 115 may receive redundant versions of the same signal over a number of antennas, one of which may be shared between the two radios. In certain instances, an aggressor radio may take control of the shared antenna from a victim radio, even if the antenna is actively serving the victim radio. Accordingly, the victim radio may detect the loss of access to the shared antenna by detecting a hardware event, such as a change in an antenna switch control or an impedance mismatch. After detection, the victim radio may recover from the antenna loss by adjusting or modifying a maximal ratio combining (MRC) operation. For example, the victim radio may disregard the signal version from the shared antenna in the computation of MRC weights. In another example, the victim radio may interrupt an MRC weight computation and use MRC weights from a previous calculation. In some cases, the selection of MRC weights may be based at least in part on signal strength, time elapsed since the last successful MRC calculation, or channel coherence.

Figure 2:
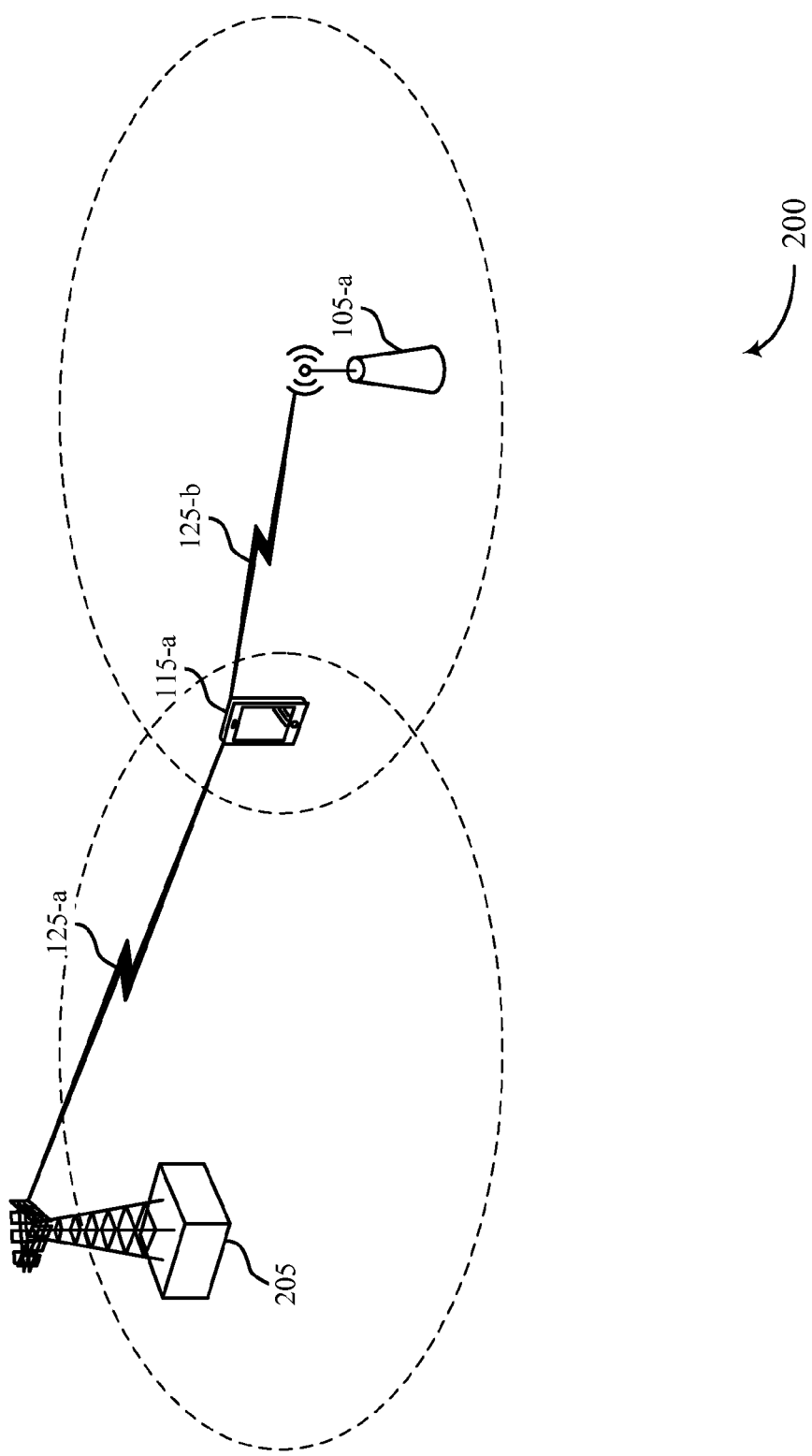
FIG. 2 illustrates an example of a wireless communications system that supports shared antenna loss detection and recovery in accordance with various aspects of the present disclosure.

FIG. 2 illustrates a wireless communications system 200 that supports shared antenna loss detection and recovery in accordance with various aspects of the present disclosure. Wireless communications system 200 may facilitate recognition of shared antenna loss by a STA 115 with multiple radios by detecting related hardware events. Wireless communications system 200 may also provide recovery techniques for signals associated with abrupt shared antenna loss by altering receive-side processing of the signals. Wireless communications system 200 may include a WLAN AP 105-a, a cellular base station 205, and STA 115-a, which may be examples of devices described herein, and with reference to FIG. 1. In some cases, the same device or a set of collocated devices may function as both a WLAN AP 105 and a cellular base station 205, but for the purposes of clarity in the present disclosure, WLAN APs 105 and cellular base stations 205 will be described as separate entities.

STA 115-a may use different radios to communicate with wireless communication devices that support different radio access technologies. For example, STA 115-a may use an LTE radio (not shown) to communicate with cellular base station 205 via LTE communication link 125-a. Similarly, STA 115-a may use a Wi-Fi radio (not shown) to communication with WLAN AP 105-b via Wi-Fi communication link 125-b. Additionally, STA 115-a may support MIMO communications for each radio by using more than one antenna to transmit or receive a signal. In some cases, two (or more) radios may share an antenna; that is, the antenna may switch connected states between the associated radios. Accordingly, each radio may have a monopoly on one or more dedicated antennas and timeshare one or more shared antennas. For example, the LTE radio may use two dedicated antennas, with support from the shared antenna, for LTE MIMO communications. The Wi-Fi radio may use the same shared antenna in conjunction with one or more dedicated Wi-Fi antennas for Wi-Fi MIMO communications.

During a MIMO receive operation, each of the antennas may receive a replica, or different version, of the same information bearing signal, which may provide signal spatial diversity. To increase the signal-to-noise ratio (SNR) of a signal, each version of the signal received at each antenna may be weighted, or scaled, before being combined with weighted versions associated with other antennas (e.g., via a maximal ratio combining (MRC) operation). In some cases, the weight factor for an antenna may be proportional to the strength or amplitude of the signal received by the antenna. That is, an antenna with a strong signal may be amplified while an antenna with a weak signal may be attenuated. A radio may apply the computed weights to each respective version of the signal before performing equalization. In some instances, a radio may store an MRC weight after it has been computed, or after it has been used to equalize a signal (i.e., the radio may store the latest weight for an antenna). Thus, the stored weight may be used in a subsequent equalization operation. The present example is directed towards a system featuring cellular (e.g., LTE) and WLAN (e.g., Wi-Fi) communications; however, the techniques described herein may be used to support other combinations of radios or radio access technologies. Additionally, the techniques described herein may be implemented for any wireless communication device.

In some cases, communications associated with one radio access technology may be prioritized over communications associated with other radio access technologies. For instance, certain LTE communications may be given a higher priority than certain Wi-Fi communications. To ensure quality communications for the high priority communications, the STA 115-a may dedicate more resources (e.g., antennas) or give more deference to the high priority communications. Accordingly, in the present example, the LTE radio may be given permission to use the shared antenna, regardless of the mode of operation associated with the Wi-Fi radio. That is, if the LTE radio is scheduled to communicate a signal that is high-priority, the LTE radio may steal the shared antenna, even if the Wi-Fi radio is in the process of using the shared antenna to communicate (e.g., receive a signal). In some cases, STA 115-a may facilitate moving the shared antenna from one radio to another via an antenna switch control (e.g., the antenna switch control may physically disconnect the shared antenna from the Wi-Fi radio and connect the shared antenna to the LTE radio). The STA 115-a may distribute the shared antenna according to prioritization based at least in part on radio access technology, signal type, signal information, or signal quality. The prioritization may be determined by the STA 115-a, or by an external entity, such as an equipment manufacturer, AP 105-a, cellular base station 205, etc. The prioritization may be static or dynamic.

In the present example, when the Wi-Fi radio loses the shared antenna to the LTE radio, the Wi-Fi radio may recognize a hardware event indicative of the loss. Detecting the loss via hardware may avoid latencies and power consumption associated with software detection. In one example, the Wi-Fi radio may reference or monitor the state of the antenna switch control. Based at least in part on the configuration of the antenna switch control, the Wi-Fi radio may determine the current connection state of the shared antenna, thus detecting whether the shared antenna has moved from the Wi-Fi radio to the LTE radio.

In another example, the Wi-Fi radio may detect the loss of the shared antenna based at least in part on an impedance mismatch at a port of the Wi-Fi radio. In order to increase power-transfer, the impedance of a connected antenna may be matched to that of the power source. However, when an antenna is disconnected from a port, the impedance seen looking out of the port may resemble that of an open circuit. Thus, when the shared antenna is removed from the Wi-Fi radio, the Wi-Fi radio may detect the resulting impedance mismatch and determine that there has been an antenna loss. The Wi-Fi radio may detect the impedance mismatch using any means known in the art.

In some cases, there may be a delay between the reception of a signal and equalization of the signal. When an antenna is removed during a receive operation, a radio may detect the loss and interrupt the MRC weight computation block. In such cases, the radio may adjust receive-side processing of the signal to accommodate the interrupted MRC computation. In certain examples, latency in the MRC computation interruption may result in contamination of the weight associated with the shared antenna; that is, the MRC computation may use meaningless inputs from the disconnected port to determine the shared antenna weight. In such a case, the radio may modify MRC operations based at least in part on the strength of the received signal. For example, if the received signal (e.g., the version(s) received over the dedicated antenna(s)) is sufficiently strong the STA 115 may determine that diversity may be foregone. Accordingly, the STA 115 may use weights from the intact antennas to equalize the signal (i.e., the weight associated with the shared antenna may be dropped).

In certain instances, shutting off the MRC computation block may result in unfinished MRC computations; that is, the received signal may be awaiting equalization but there may not be associated weights available. In such cases, the radio may use stored antenna weights to equalize the signal; that is, stored antenna weights may be applied to signal versions received by the corresponding antennas. In some cases, the radio may use a combination of stored antenna weights and instantaneous antenna weights (i.e., those computed using measurements of the pending received signal) to equalize the signal. Although described with reference to a shared antenna, the techniques disclosed herein may be used to detect and recover from antenna loss of a non-shared (i.e., dedicated) antenna. Additionally, the techniques disclosed herein may be implemented by a wireless communication system utilizing different (e.g., higher) levels of diversity. That is, the techniques may be applied to a system which received N signal versions, one or more of which may be associated with a removed antenna.

Figure 3:
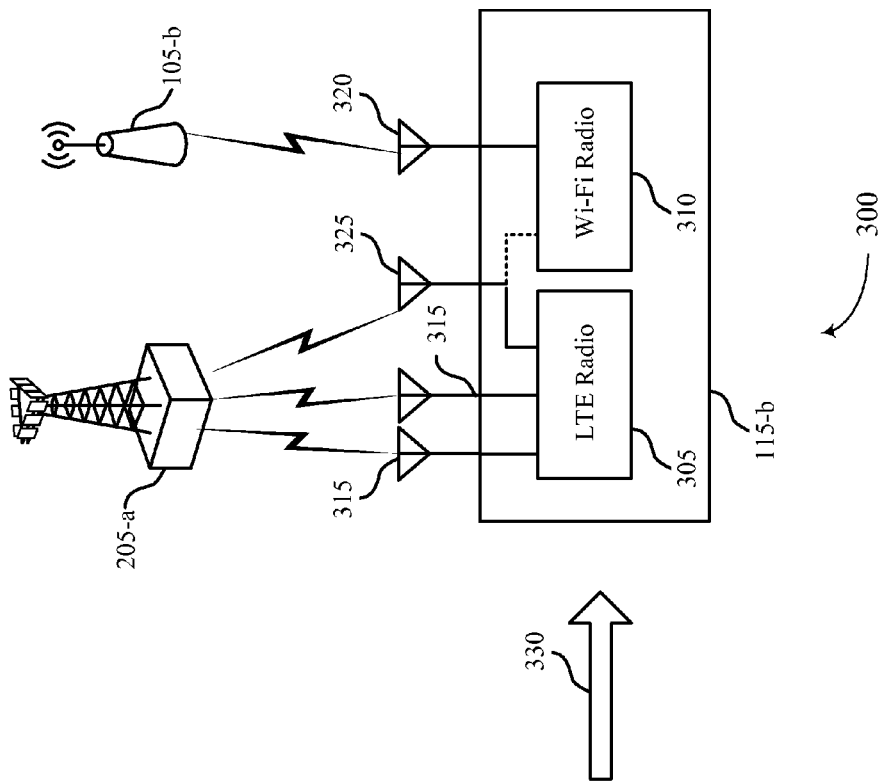
FIG. 3 illustrates an example of a wireless communications system that supports shared antenna loss detection and recovery in accordance with various aspects of the present disclosure.
Figure 3:
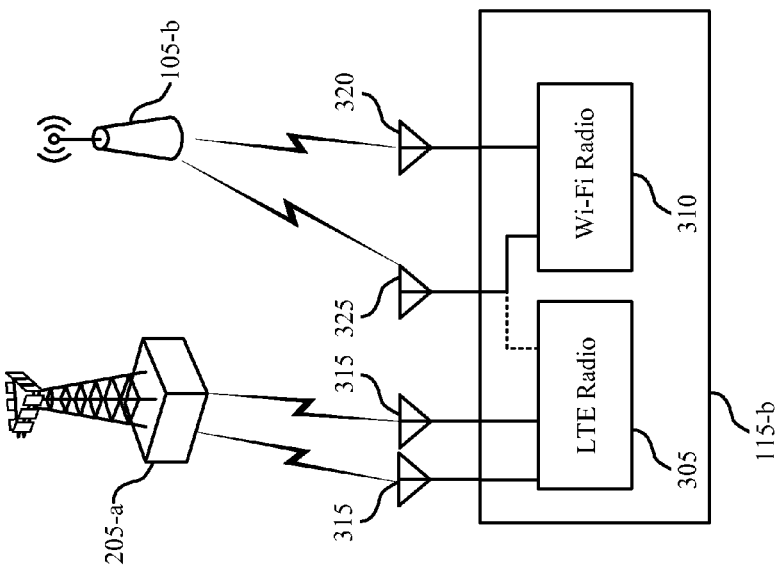

FIG. 3 illustrates an example of a wireless communications system 300 that supports shared antenna loss detection and recovery in accordance with various aspects of the present disclosure. Radio configuration may include AP 105-b and cellular base station 205-a, which may perform the functions described herein and with reference to FIG. 1. Radio configuration may also include a STA 115-b, which be an example of a STA 115 described herein and with reference to FIGS. 1-2. STA 115-b may include an LTE radio 305 and a Wi-Fi radio 310, each of which may use antennas that are directed solely to each respective radio access technology.

Although described in the context of an LTE radio 305 and a Wi-Fi radio 310, the techniques described with respect to FIG. 3 may be applicable to radios implementing any type of radio access technology, including BT (Bluetooth), NFC (near field communication), wireless wide area network technologies (WWAN) in licensed and unlicensed spectrums, wireless local area network (WLAN) technologies, Zigbee, etc. Additionally, the techniques described herein may be implemented by different types of wireless communication devices, including STAs 115-b, AP 105s, or cellular base stations 205, and cellular user equipment (UEs). Under this configuration, one of the radios 305, 310 of the STA 115-b may rapidly detect an abrupt loss of a shared antenna 325 to the other radio 305, 310. The rapid detection may avoid software latencies by recognizant hardware effects related to the removal of the shared antenna 325 from a radio connection.

The STA 115-b may support MIMO communications by using multiple antennas to transmit and receive. For example, the STA 115-b may use two antennas to receive signals from two antenna's located at an AP 105 (i.e., the STA 115-b may engage in 2×2 communications). In some cases, the STA 115-b may modify the number of antennas used for communication. For example, the STA 115-b may switch between 2×2 communications and 3×3 communications by using two dedicated antennas and then adding the use of a shared antenna. The distribution of antennas at the STA 115-b (i.e., which radio access technology the antennas are currently supporting) may be called the antenna configuration. In the present example, STA 115-b may select an antenna configuration based at least in part on prioritization of the respective communications of the radios by allocating shared antenna 325. Although the present illustrative example is directed towards 1×1, 2×2, and 3×3 antenna configurations, the techniques described herein may be implemented according to other antenna configurations, including those featuring more than one shared antenna 325.

In the wireless communications system 300, LTE radio 305 may use two dedicated LTE antennas 315 for LTE communications with cellular base station 205-a, with an option to use shared antenna 325. Wi-Fi radio 310 may use a dedicated Wi-Fi antenna 320 for Wi-Fi communications with AP 105-b, with an option to use shared antenna 325. Thus, shared antenna 325 may be switched between LTE radio 305 and Wi-Fi radio 310. In an M×M antenna configuration, Wi-Fi radio 310 may receive redundant versions, or replicas, of the same signal which have taken different propagation paths. For example, dedicated Wi-Fi antenna 320 may receive a different version of signal than shared antenna 325. In order to equalize the signal, Wi-Fi radio 310 may weight each version of the signal on instantaneous measurements of a signal as it is received. For example, Wi-Fi radio 310 may determine MRC weights for each antenna based measured characteristics of each respective signal version, such as signal strength. The MRC weights for each antenna may then be applied to the respective signal versions associated with each antenna and used to equalize the signal. In some cases, the MRC weights may be stored for future use (e.g., after computation or after equalization). Thus, in some cases the Wi-Fi radio 310 may refrain from an MRC weight calculation by leveraging a previous MRC weight calculation and applying the weights on the signals coming from the pertinent antenna ports which are still connected.

At some point, STA 115-b may switch 330 antenna configurations. That is, STA 115-b may change from the 2×2 Wi-Fi antenna configuration to a 1×1 Wi-Fi antenna configuration. Thus, LTE radio 305 may use both dedicated LTE antennas 315 and shared channel 325 to communicate. In one example, LTE radio 305 may take control of ("yank") shared antenna 325 from Wi-Fi radio 310 without warning, regardless of Wi-Fi communications on shared antenna 325. LTE radio 305 may steal shared antenna 325 upon the determination that a scheduled LTE communication is higher priority than a co-existent Wi-Fi communication. Instead of waiting for an indication from LTE radio 305, Wi-Fi radio 310 may determine the removal of shared antenna by detecting a change in hardware. For example, Wi-Fi radio 310 may measure the impedance of the shared antenna 325 port and determine the shared antenna 325 has been removed based at least in part on an impedance mismatch. In another example, Wi-Fi radio 310 may sample the state of an antenna switch control to determine if shared antenna 325 has been stolen.

Based at least in part on the detection of the removal of shared antenna 325, Wi-Fi radio 310 may adjust MRC weight selection. Shared antenna 325 may have meaningless signal information once it has been disconnected from Wi-Fi radio 310; accordingly, Wi-Fi radio 310 may refrain from equalizing signals associated with shared antenna 325. For example, Wi-Fi radio 310 may drop the weight associated with shared antenna 325, thereby using the intact signal versions (e.g., from dedicated Wi-Fi antenna 320) for equalization. Wi-Fi radio 310 may optionally use stored MRC weights of the connected antenna port from a previous computation for equalization of signals coming from the connected antenna port. In some cases, a combination of stored and instantaneous weighs may be used. For example, Wi-Fi radio 325 may utilize an MRC weight from a previous, successfully completed MRC computation and an MRC weight associated with the signal received over Wi-Fi radio 310 (e.g., a computed instantaneous MRC weight) to equalize the signal. Wi-Fi radio 310 may select MRC weights based at least in part on the time that has elapsed since a previous MRC computation. For example, if the time elapsed since storing the most recent MRC weights is less than a certain threshold, Wi-Fi radio 310 may opt to select the store weights. Wi-Fi radio 310 may also base weight selection on channel coherence. That is, Wi-Fi radio 310 may measure a channel condition associated with a version of the signal. If the channel condition satisfies a given threshold, Wi-Fi radio 310 may modify MRC weight selection. In some cases, the MRC modification may be adjusted based at least in part on a change in channel conditions. In some cases, a combination of channel conditions and a time threshold may be used to determine MRC weight selection.

Figure 4:
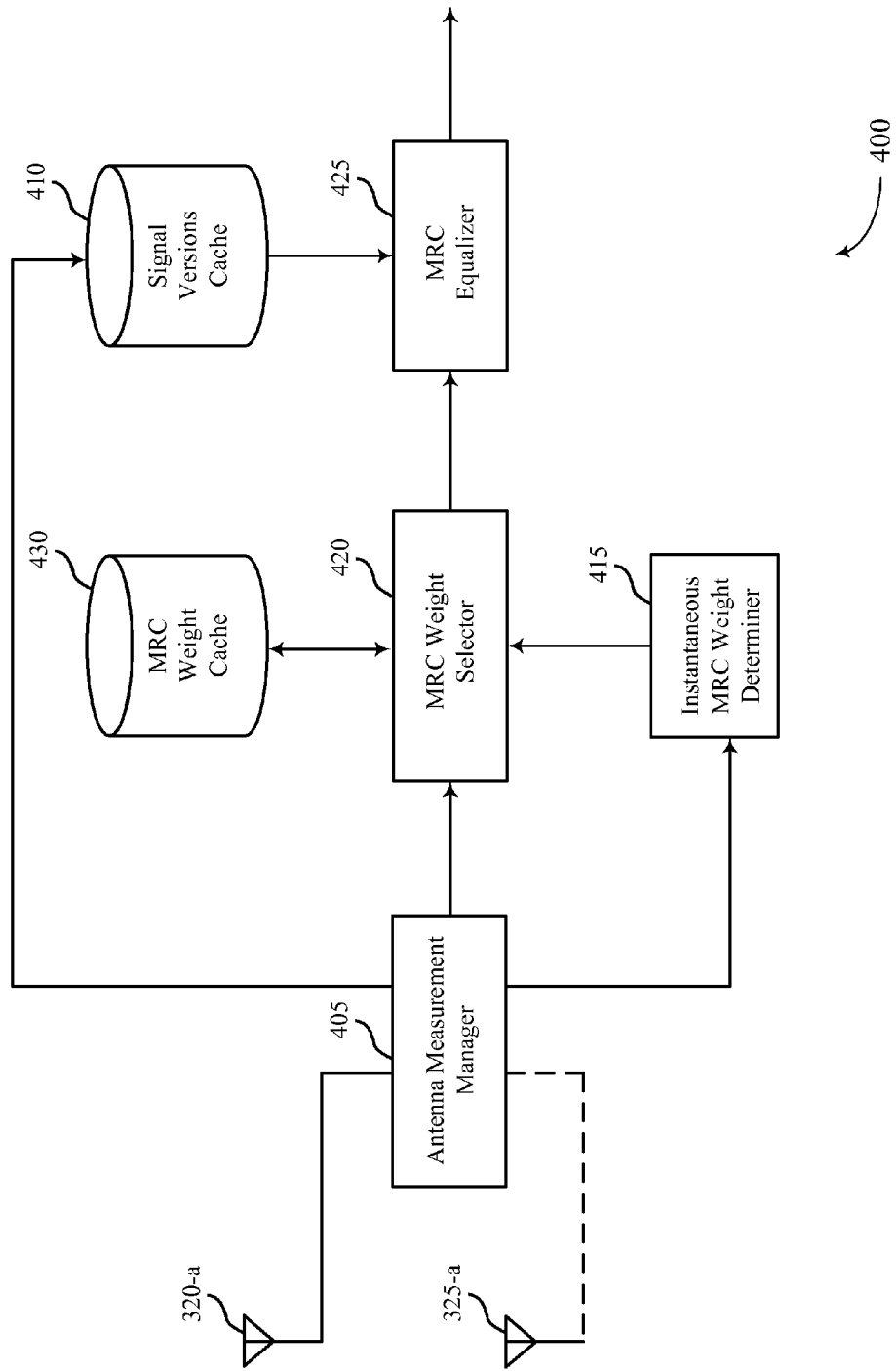
FIG. 4 illustrates an example of a signal equalization system that supports shared antenna loss detection and recovery in accordance with various aspects of the present disclosure.

FIG. 4 illustrates an example of a signal equalization system 400 that supports shared antenna loss detection and recovery in accordance with various aspects of the present disclosure. Signal equalization system 400 may be implemented by a radio (e.g., in a STA 115) to determine MRC weights for a signal after a shared antenna has been removed during a receive process. Signal equalization system 400 may be used to determine MRC weights for cases in which an MRC computation has been shut off before finishing, or in instances in which an MRC computation is contaminated with meaningless inputs (e.g., inputs from a shared antenna port that has been disconnected). Signal equalization system 400 may include a shared antenna 325-a and a dedicated antenna 320-a. Signal equalization system 400 may be implemented by any type of wireless communications device such as an AP 105, cellular base station 205, or a STA 115. In some cases, the components of signal equalization system 400 are included in a shared antenna manager.

Shared antenna 325-a and dedicated antenna 320-a may receive different versions of MIMO signals and pass them to antenna measurement manager 405. That is, dedicated antenna 320-a and shared antenna 325-a may receive replicas of the same signal and communicate each version to antenna measurement manager 405. Antenna measurement manager 405 may be responsible for measuring characteristics associated with signal versions and the channels over which the signals are communicated, such as signal quality (e.g., noise, interference, strength, etc.). Antenna measurement manager 405 may also measure antenna parameters such as impedance. Antenna measurement manager 405 may communicate with other components of the signal equalization system 400. For example, antenna measurement manager 405 may pass versions of a signal to signal version cache 410 for future use. Antenna measurement manager 405 may also pass signal or antenna measurements to instantaneous MRC weight determiner 415 and MRC weight selector 420.

Instantaneous MRC weight determiner 415 may calculate MRC weights for antennas using the measurements from antenna measurement manager 405. Instantaneous MRC weight determiner 415 may communicate the computed MRC weights for each signal version to MRC weight selector 420. MRC weight selector 420 may select which weights to transmit to MRC equalizer 425. MRC equalizer 425 may equalize cached versions of the signal using the weights selected by MRC weight selector 420. In some cases, MRC weight selector 420 may store selected weights after they have been used in equalization of a signal. In other cases, MRC weight selector 420 may store selected weights as soon as they are passed from instantaneous MRC weight determiner 415. Accordingly, MRC weight selector 420 may choose to use either instantaneous MRC weights or stored MRC weights, or a combination.

At some point, shared antenna 325-a may be disconnected from antenna measurement manager 405. In such an instance, the loss of access to shared antenna 325 may be recognized by sampling an antenna switch control (not shown), or referencing measured antenna impedance for a mismatch. In some cases, the loss of shared antenna 325 may result in an MRC computation shut-off, or interruption. The interruption may stop one or more MRC computations in-process. For example, in some cases the MRC computation shut-off may halt the computation of weights for one antenna but not another. In other cases, the loss of shared antenna 325 may result in meaningless measurements (e.g., from the shared antenna 325 port) being used for an MRC computation. Accordingly, receive-side processing adjustments may be made to accommodate the MRC disruption caused by removal of, or loss of access to, shared antenna 325-a.

For example, MRC weight selector 420 may modify the selection of weights used for equalization of a signal. In one case, MRC weight computations may be successfully completed by MRC weight selector 420 using the measurements from antenna measurement manager 405. However, the computed weight for shared antenna 325-a may be corrupt if the computation used measurements from the associated antenna port after shared antenna 325-a was been removed. In such an instance, MRC weight selector 420 may drop the weight associated with shared channel 325-a, and select the instantaneous weight associated with dedicated antenna 320-a for equalization. Thus, diversity gain may be foregone (e.g., if the signal strength of the dedicated antenna version is sufficient).

In some cases, instantaneous MRC weight determiner 415 may be interrupted during MRC calculations such than an MRC computation is not run to completion. Accordingly, instantaneous MRC weight determiner 415 may not have any MRC weights available to pass to MRC weight selector 420. In such instances, MRC weight selector 420 may retrieve stored weights from MRC weight cache 430. MRC weight cache 430 may store weights associated with previous successful MRC weight computations or successful signal equalization. The stored MRC weights may be those most recently computed or used. In certain cases, a combination of instantaneous and stored weights may be selected. For instance, if an MRC computation is interrupted for shared antenna 325-a but not for dedicated antenna 320-a, MRC weight selector 420 may select an instantaneous weight for the dedicated channel and a stored weight for shared antenna 325-a. Accordingly, a stored weight may be used for an antenna associated with an incomplete (or corrupted) weight computation.

In certain instances, the selection of MRC weights may be based at least in part on signal strength measurements from antenna measurement manager 405. For example, if a signal strength of a version is weak (e.g., weak enough that diversity gain is important), MRC weight selector 420 may decide to use stored MRC weights rather than dropping a signal version.

Figure 5:
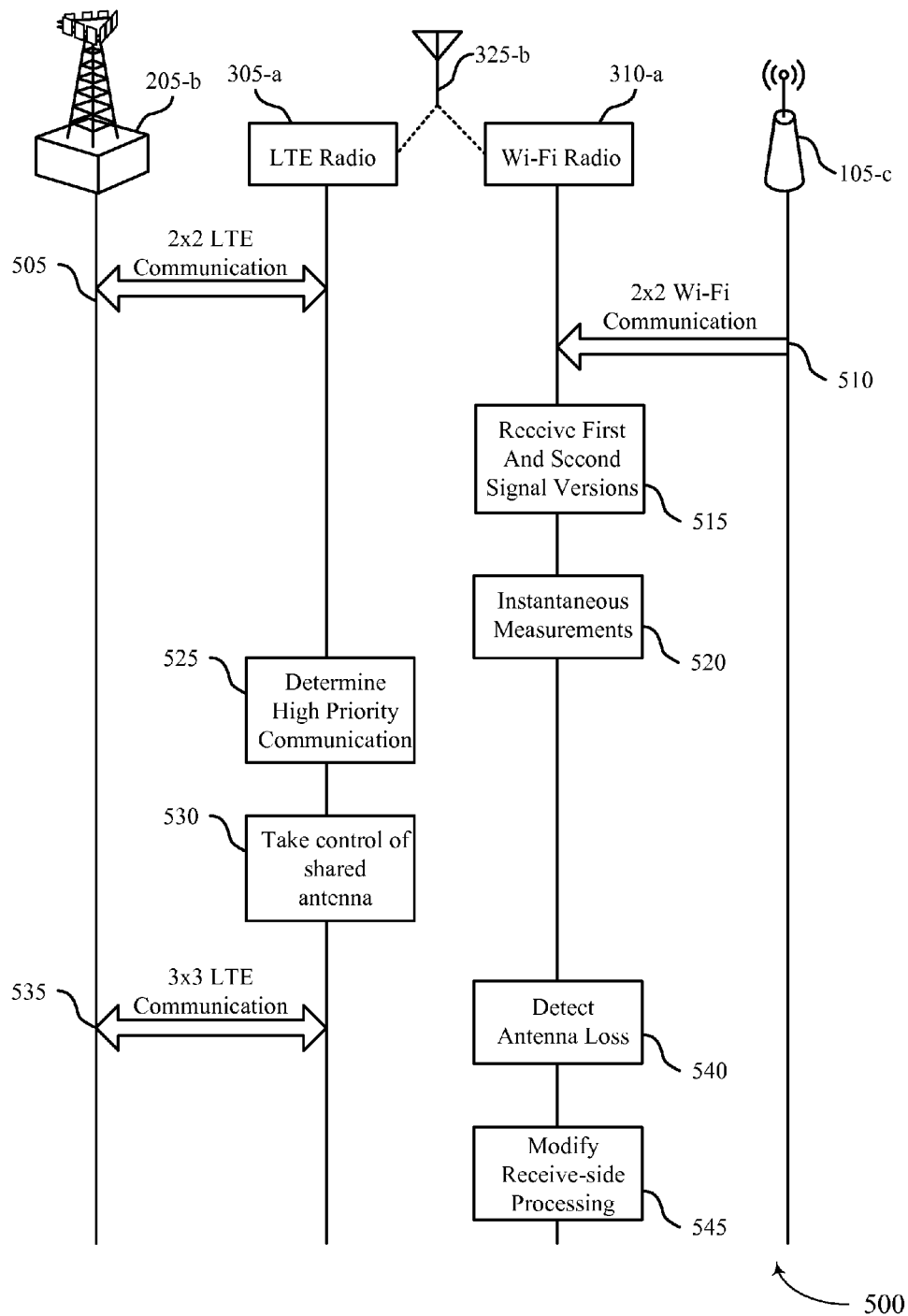
FIG. 5 illustrates an example of a process flow that supports shared antenna loss detection and recovery in accordance with various aspects of the present disclosure.

FIG. 5 illustrates an example of a process flow 500 supporting shared antenna loss detection and recovery in accordance with various aspects of the present disclosure. Process flow 500 may include LTE radio 305-a and Wi-Fi radio 310-a, which may be examples of an LTE radio 305 and Wi-Fi radio 310, respectively, described herein and with reference to FIG. 3. Process flow 500 may also include shared antenna 325-b which may be connected to either LTE radio 305-a or Wi-Fi radio 310-a at any given time.

At 505, LTE radio 305-b may engage in LTE communications with cellular base station 205-b according to a 2×2 antenna configuration. At 510, Wi-Fi radio 310-b may receive a Wi-Fi transmission from AP 105-c using shared antenna 325-b and a dedicated antenna (not shown), according to a 2×2 antenna configuration. Accordingly, at 515, Wi-Fi radio 310-a may receive a first version of a signal using a dedicated antenna and a second version of the signal using shared antenna 325-b.

At 520, Wi-Fi radio may make instantaneous measurements of the first and second signals. In some cases, the instantaneous measurements include signal strength measurements. In certain examples, the instantaneous measurements include quality measurements.

At 525, LTE radio 305-a may determine that an LTE communication is a high priority. The determination may be based at least in part on the LTE signal information, type, quality, etc. In some cases, the determination may also be based at least in part on parameters associated with the Wi-Fi communication between Wi-Fi radio 310-a and AP 105-c.

At 530, based at least in part on the prioritization, LTE radio 305-a may take control of the shared antenna 325-b from Wi-Fi radio 310-a. For example, shared antenna 325-b may be disconnected from Wi-Fi radio 310-a and connected to LTE radio 305-a. In some cases, an antenna switch control may be used to facilitate the switch. In some examples, LTE radio 305-a may take control of shared antenna 325-b from Wi-Fi radio 310-a while Wi-Fi radio 310-a is receiving a signal. That is, the loss of access to shared antenna 325-b may occur during a receive operation of Wi-Fi radio 310-a in which the dedicated antenna and shared antenna 325-b are used.

Accordingly, at step 535 LTE radio 305-a may begin communicating with cellular base station 205-b according to a 3×3 antenna configuration. At 540, Wi-Fi radio 310-a may detect the loss of access to shared antenna 325-b. In some cases the detection may be based at least in part on a hardware event. The hardware event may be associated with the loss of shared antenna 325-b. In some examples, Wi-Fi radio 310-a may detect the removal of shared antenna 325-b by detecting an impedance mismatch associated with shared antenna 325-b. In some examples, Wi-Fi radio 310-a may detect a change in an antenna switch control associated with shared antenna 325-b. Accordingly, Wi-Fi radio 310-a may determine the removal of shared antenna 325-b based at least in part on the change detected in the antenna switch control. In certain examples, Wi-Fi radio 310-a may interrupting a maximal ratio combining (MRC) weight computation for the dedicated antenna and shared antenna 325-b.

At 545, Wi-Fi radio may modify receive-side processing of the first version of the signal and the second version of the signal based at least in part on the loss of access to shared antenna 325-b. Modifying the receive-side processing may be based at least in part on the measured signal strength. In some examples, modifying the receive-side processing includes modifying a maximal ratio combining (MRC) weight associated with one of the antennas. For instance, Wi-Fi radio 310-a may assign no MRC weight to shared antenna 325-b. Thus, Wi-Fi radio 310-a may refrain from using the second version of the signal during an MRC equalization of the signal. In some examples, modifying the receive-side processing includes using a stored MRC weight associated with a previously completed MRC weight computation in connection with the first version of the signal or the second version of the signal during an MRC equalization of the signal. In some examples, the previously completed MRC weight computation is completed prior to the loss of access to shared antenna 325-b.

In some cases, Wi-Fi radio 310-a may determine whether an elapsed amount of time since the most recently completed MRC weight computation satisfies a threshold. In this or other examples, Wi-Fi radio 310-a may determine if a channel condition satisfies a threshold. Accordingly, Wi-Fi radio 310-a may use the stored MRC weight based at least in part on the satisfaction of the time or channel condition threshold. In some examples, modifying the receive-side processing may include determining a first channel weight for the dedicated antenna based at least in part on instantaneous measurements at the dedicated antenna. Thus, Wi-Fi radio 310-a may perform the MRC equalization of the signal using the first channel weight for the first version of the signal and the stored channel weight from the previously completed MRC weight computation for the second version of the signal.

Figure 6:
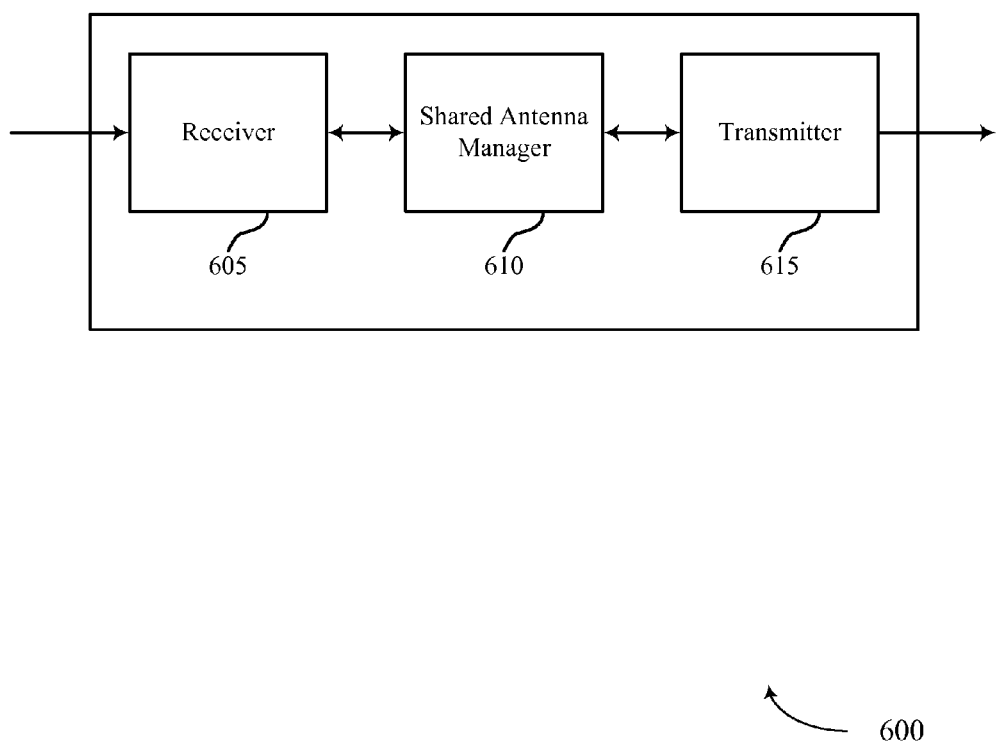
FIG. 6 shows a block diagram of a wireless device that supports shared antenna loss detection and recovery in accordance with various aspects of the present disclosure.

FIG. 6 shows a block diagram of a radio 600 configured for shared antenna loss detection and recovery in accordance with various aspects of the present disclosure. Radio 600 may be used by a wireless device (such as an AP 105, cellular base station 205, or STA 115) for wireless communications according to a certain radio access technology. For instance, radio 600 may be an example a Wi-Fi radio 310 or a LTE radio 305 as described with reference to FIGS. 3-5. Radio 600 may include a receiver 605, a shared antenna manager 610, or a transmitter 615. Radio 600 may also include a processor. Each of these components may be in communication with each other.

The components of radio 600 may, individually or collectively, be implemented with at least one application specific integrated circuit (ASIC) adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

The receiver 605 may receive information such as packets, user data, or control information associated with various information channels (e.g., control channels, data channels, and information related to shared antenna loss detection and recovery, etc.). Information may be passed on to the shared antenna manager 610, and to other components of radio 600. In some cases, receiver 605 includes both dedicated and shared antennas.

The shared antenna manager 610 may receive a first version of a signal using a first (e.g., dedicated) antenna and a second version of the signal using a second (e.g., shared) antenna. The second antenna may be shared, by radio 600, with another radio operating according to the same or different radio access technology. Shared antenna manager 610 may detect loss of access to the second antenna. The detection may be based at least in part on a hardware event. Based at least in part on the loss of access to the second antenna, shared antenna manager 610 may modify receive-side processing of the first version of the signal and the second version of the signal The transmitter 615 may transmit signals received from other components of radio 600. In some examples, the transmitter 615 may be collocated with the receiver 605 in a transceiver module. The transmitter 615 may include dedicated or shared antennas.

Figure 7:
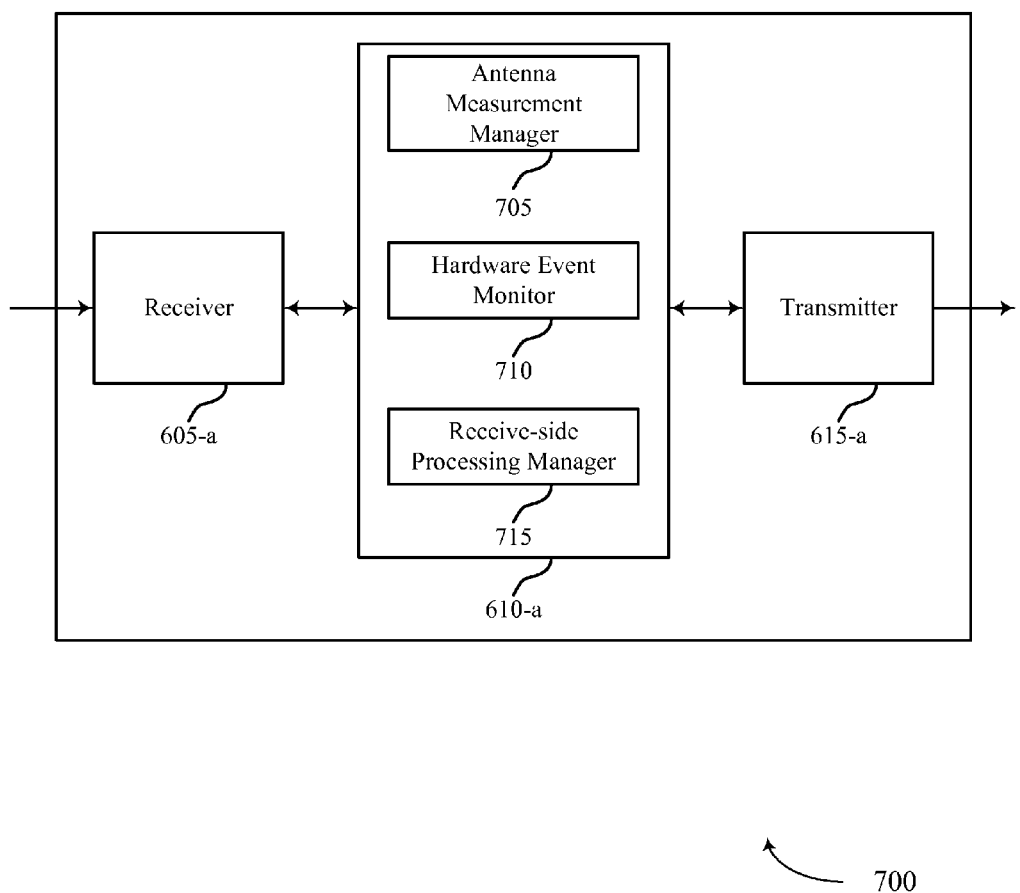
FIG. 7 shows a block diagram of a wireless device that supports shared antenna loss detection and recovery in accordance with various aspects of the present disclosure.

FIG. 7 shows a block diagram of a radio 700 for shared antenna loss detection and recovery in accordance with various aspects of the present disclosure. Radio 700 may be an example of aspects of a radio 600 described with reference to FIG. 6. Radio 700 may include a receiver 605-*a*, a shared antenna manager 610-*a*, or a transmitter 615-*a*. Radio 700 may also include a processor. Each of these components may be in communication with each other. The shared antenna manager 610-*a* may also include an antenna measurement manager 705, a hardware event monitor 710, and a receive-side processing manager 715.

The components of radio 700 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The receiver 605-*a* may receive information which may be passed on to shared antenna manager 610-*a*, and to other components of radio 700. The shared antenna manager 610-*a* may perform the operations described herein with reference to FIG. 6. The transmitter 615-*a* may transmit signals received from other components of radio 700.

The antenna measurement manager 705 may receive a first version of a signal using a first (e.g., dedicated) antenna as described herein with reference to FIGS. 2-5. The antenna measurement manager 705 may also receive a second version of the signal using a second (e.g. shared) antenna. The second antenna may be shared between radio 700 and another radio. The antenna measurement manager 705 may also measure a signal strength of at least one of the versions of the signal. In some cases, modifying the receive-side processing is based at least in part on the measured signal strength.

The hardware event monitor 710 may detect a loss of access to the second antenna based at least in part on a hardware event as described herein with reference to FIGS. 2-5. In some examples, detecting the loss of access to the second antenna includes detecting an impedance mismatch associated with the second antenna. In some examples, detecting the loss of access to the second antenna includes detecting a change in an antenna switch control associated with the second antenna. In some examples, the loss of access to the second antenna occurs during a receive operation of the first radio using the first and second antennas.

The receive-side processing manager 715 may modify receive-side processing of the first version of the signal and the second version of the signal based at least in part on the loss of access to the second antenna as described herein with reference to FIGS. 2-5. In some examples, modifying the receive-side processing includes interrupting a maximal ratio combining (MRC) weight computation for the first antenna and the second antenna.

Figure 8:
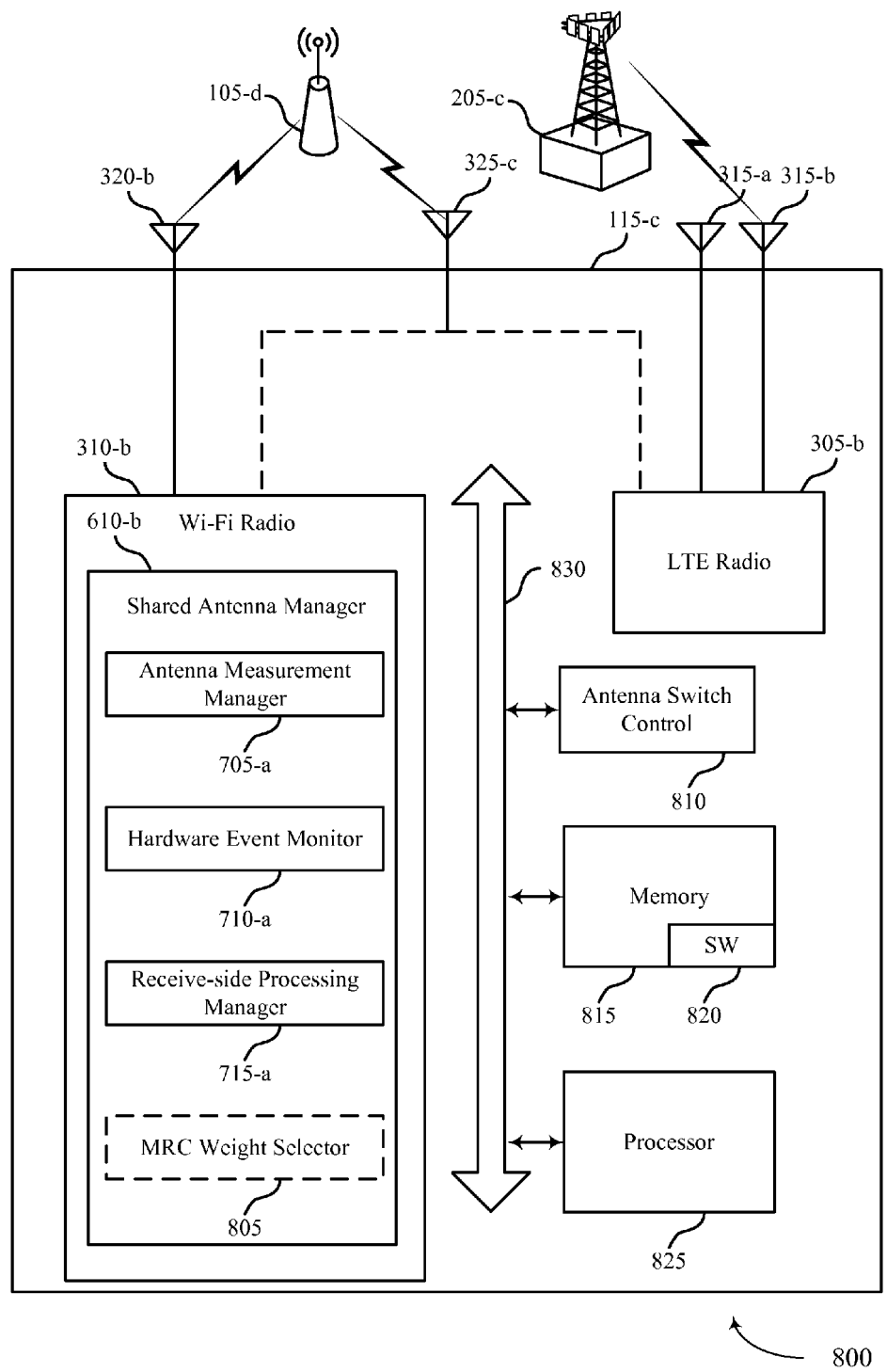
FIG. 8 shows a block diagram of a wireless device that supports shared antenna loss detection and recovery in accordance with various aspects of the present disclosure.

FIG. 8 shows a diagram of a system 800 including a STA 115-*c* configured for shared antenna loss detection and recovery in accordance with various aspects of the present disclosure. STA 115-*c* include a Wi-Fi radio 310-*b* and an LTE radio 305-*b*, each of which may perform the operations described herein with reference to FIGS. 1-7. Wi-Fi radio 310-*b* may include a shared antenna manager 910, which may be an example of a shared antenna manager 610 described with reference to FIGS. 6 and 7. STA 115-*c* may also include an antenna switch control 810. These and other components (not shown) of STA 115-*c* may provide for bi-directional voice and data communications. For example, STA 115-*c* may communicate bi-directionally with AP 105-*d* or cellular base station 205-*c* using shared antenna 325-*c* and dedicated Wi-Fi antennas 320-*b* or dedicated LTE antennas 315-*a*, respectively.

The shared antenna manager 610-*b* which may be a component of a radio 600 or a radio 700 for shared antenna loss detection and recovery in accordance with various aspects of the present disclosure. The shared antenna manager 610-*b* may be an example of aspects of a shared antenna manager 610 described with reference to FIGS. 6-7. The shared antenna manager 610-*b* may include an antenna measurement manager 705-*a*, a hardware event monitor 710-*a*, and a receive-side processing manager 715-*a*. Each of these modules may perform the functions described herein with reference to FIG. 7. The shared antenna manager 610-*b* may also include and an MRC weight selector 805.

The components of the shared antenna manager 610-*b* may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The MRC weight selector 805 may be configured such that modifying the receive-side processing may include modifying a maximal ratio combining (MRC) weight associated with one of the antennas as described herein with reference to FIGS. 2-5. In some examples, modifying the MRC weight associated with one of the antennas includes assigning no MRC weight to the second antenna. Thus, radio 310-*b* may refrain from using the second version of the signal during an MRC equalization of the signal. In some examples, modifying the receive-side processing includes using a stored MRC weight associated with a previously completed MRC weight computation in connection with the first version of the signal or the second version of the signal during an MRC equalization of the signal. In some examples, the previously completed MRC weight computation may be completed prior to the loss of access to the second antenna.

The MRC weight selector 805 may also determine whether an elapsed amount of time since the most recently completed MRC weight computation or a channel condition satisfies a threshold. Accordingly, the use of stored MRC weights may be based at least in part on the satisfaction of a threshold. In some examples, modifying the receive-side processing includes, determining a first channel weight for the first antenna based at least in part on instantaneous measurements at the first antenna. The MRC weight selector 805 may also perform the MRC equalization of the signal using the first channel weight for the first version of the signal and the stored channel weight from the previously completed MRC weight computation for the second version of the signal.

STA 115-c may also include a processor 825 and memory 815 (including software (SW) 820), each of which may communicate, directly or indirectly, with one another (e.g., via buses 830). The memory 815 may include random access memory (RAM) and read only memory (ROM). In some cases, the memory may include MRC weights from previously completed computations or equalizations. The processor 825 may include an intelligent hardware device, (e.g., a central processing unit (CPU), a microcontroller, an ASIC, etc.). In some cases, STA 115 may include a transceiver (not shown). The transceiver may communicate bi-directionally, via antennas 315-a, 320-b, 325-c, or wired or wireless links, with one or more networks, as described above. For example, the transceiver may communicate bi-directionally with a AP 105 or another STA 115. The transceiver may include a modem to modulate the packets and provide the modulated packets to the antenna(s) 940 for transmission, and to demodulate packets received from the antennas 315-a, 320-b, 325-c.

The memory 815 may include random access memory (RAM) and read only memory (ROM). In some cases, the memory 815 may store computer-readable, computer-executable software/firmware code 820 including instructions that, when executed, cause the processor 825 to perform various functions described herein (e.g., shared antenna loss detection and recovery, etc.). Alternatively, the software/firmware code 820 may not be directly executable by the processor 825 but cause a computer (e.g., when compiled and executed) to perform functions described herein.

Figure 9:
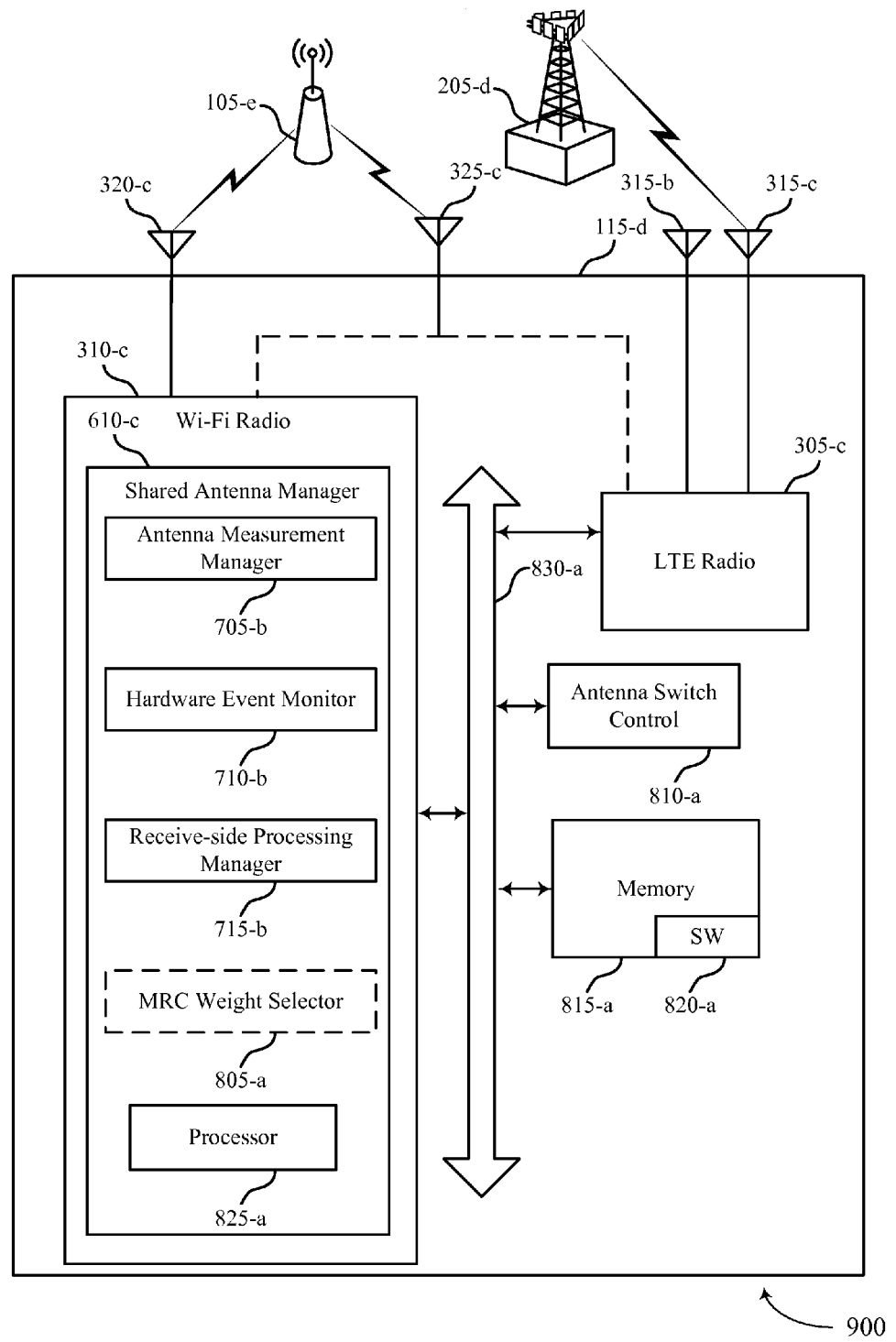
FIG. 9 illustrates a block diagram of a system including a station (STA) that supports shared antenna loss detection and recovery in accordance with various aspects of the present disclosure.

FIG. 9 shows a diagram of a system 900 including a STA 115-d configured for shared antenna loss detection and recovery in accordance with various aspects of the present disclosure. STA 115-d may include Wi-Fi radio 310-c and LTE radio 305-c, each of which may be perform the operations described herein with reference to FIGS. 1-8. Wi-Fi radio 310-c may include a shared antenna manager 610-c, which may be an example of a shared antenna manager 610 described with reference to FIGS. 6-8. STA 115-d may include an antenna switch control 810-a, memory 815-a, and antennas 320-c, 315-b, 315-c, each of which may perform the functions described with reference to FIG. 8. Buses 830-a may allow for bi-directional communication between components of STA 115-d. STA 115-d may communicate bi-directionally with AP 105-fe or cellular base station 205-d.

In the present example, Wi-Fi radio 310-c may include processor 825-a that performs some or all of the functionality of shared antenna manager 610-c. For example, processor 825-a may perform the functionality of antenna measurement manager 705-b, hardware event monitor 710-b, receive-side processing manager 715-b, and MRC weight selector 805-a, such as described with reference to FIGS. 6-8. In some cases, a subset of the functionality of shared antenna manager 610-c is performed by processor 825-a; in other cases, all of the functionality may be implemented as software executed by the processor 825-a to cause STA 115-d to perform the functions of shared antenna manager 610-c. For example, the functionality of antenna measurement manager 705-b and hardware event monitor 710-b may be accomplished by processor 825-a, while the functionality of receive-side processing manager 715-b and MRC weight selector 805-a may be accomplished using hardware external to processor 825-a. Regardless of the distribution of functionality, STA 115-d may implement antenna loss detection and receive-side processing recovery techniques as described herein.

Figure 10:
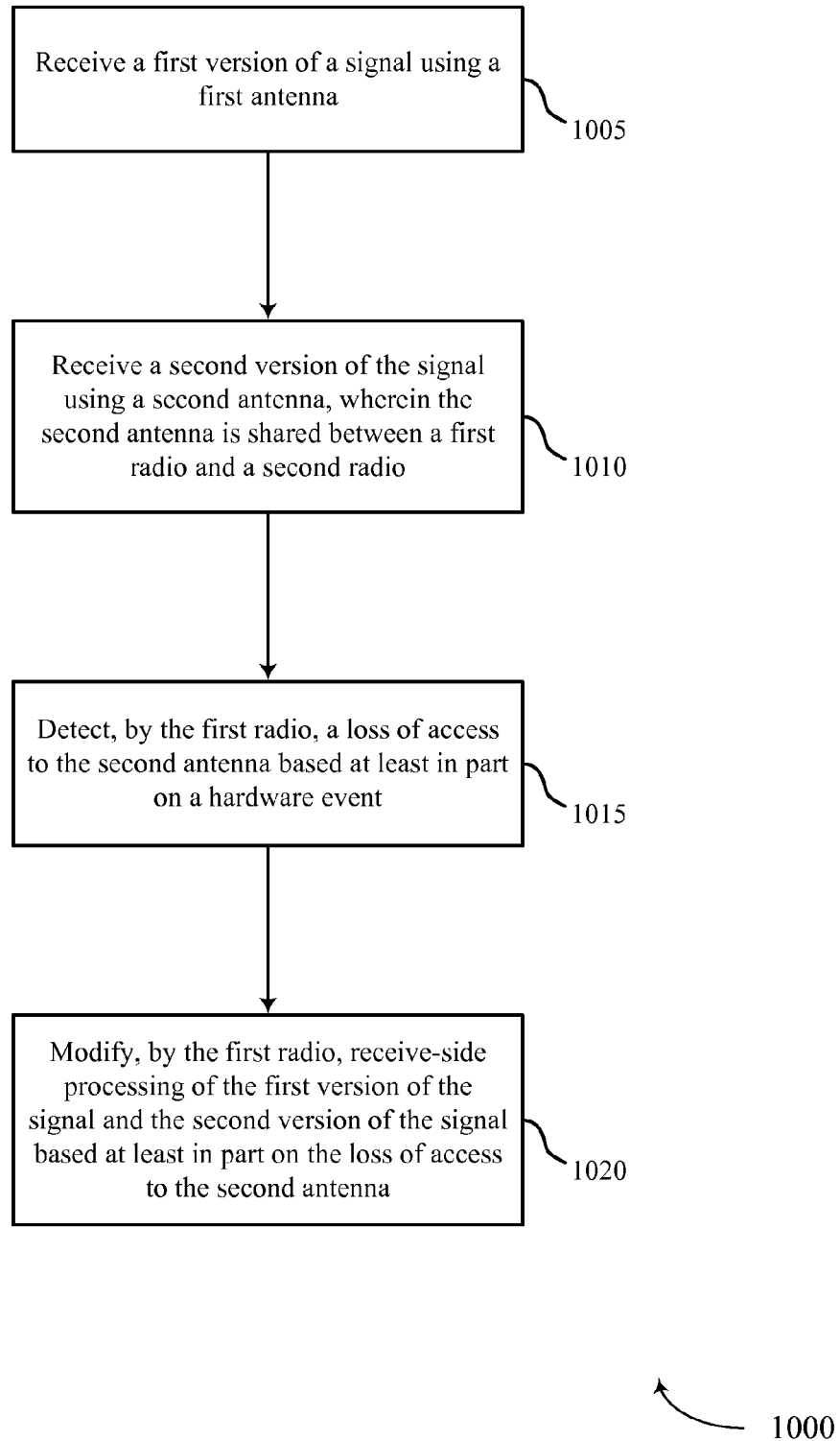
FIG. 10 illustrates a method for shared antenna loss detection and recovery in accordance with various aspects of the present disclosure.

FIG. 10 shows a flowchart illustrating a method 1000 for shared antenna loss detection and recovery in accordance with various aspects of the present disclosure. The operations of method 1000 may be implemented by a wireless communications device or its components as described with reference to FIGS. 1-9. For example, the operations of method 1000 may be performed by the shared antenna manager 610 as described with reference to FIGS. 6-9. In some examples, the wireless communications device is a STA 115. In some examples, a wireless communication device may execute a set of codes to control the functional elements of the wireless communications device to perform the functions described below. Additionally or alternatively, the wireless communications device may perform aspects the functions described below using special-purpose hardware.

At block 1005, the wireless communications device may receive a first version of a signal using a first antenna as described herein with reference to FIGS. 2-5. In certain examples, the operations of block 1005 may be performed by the antenna measurement manager 705 as described herein with reference to FIG. 7.

At block 1010, the wireless communications device may receive a second version of the signal using a second antenna. The second antenna may be shared between a first radio and a second radio as described herein with reference to FIGS. 2-5. In certain examples, the operations of block 1010 may be performed by the antenna measurement manager 705 as described herein with reference to FIG. 7.

At block 1015, the wireless communications device may detect, by the first radio, a loss of access to the second antenna based at least in part on a hardware event as described herein with reference to FIGS. 2-5. In some examples, the wireless communications device may detect the loss of access at least in part by detecting an impedance mismatch associated with the second antenna. In this or other examples, the wireless communications device may detect the loss of access at least in part by detecting a change in an antenna switch control associated with the second antenna. In certain examples, the operations of block 1015 may be performed by the hardware event monitor 710 as described herein with reference to FIG. 7.

At block 1020, the wireless communications device may modify, by the first radio, receive-side processing of the first version of the signal and the second version of the signal based at least in part on the loss of access to the second antenna as described herein with reference to FIGS. 2-5. In certain examples, the operations of block 1020 may be performed by the receive-side processing manager 715 as described herein with reference to FIG. 7.

Figure 11:
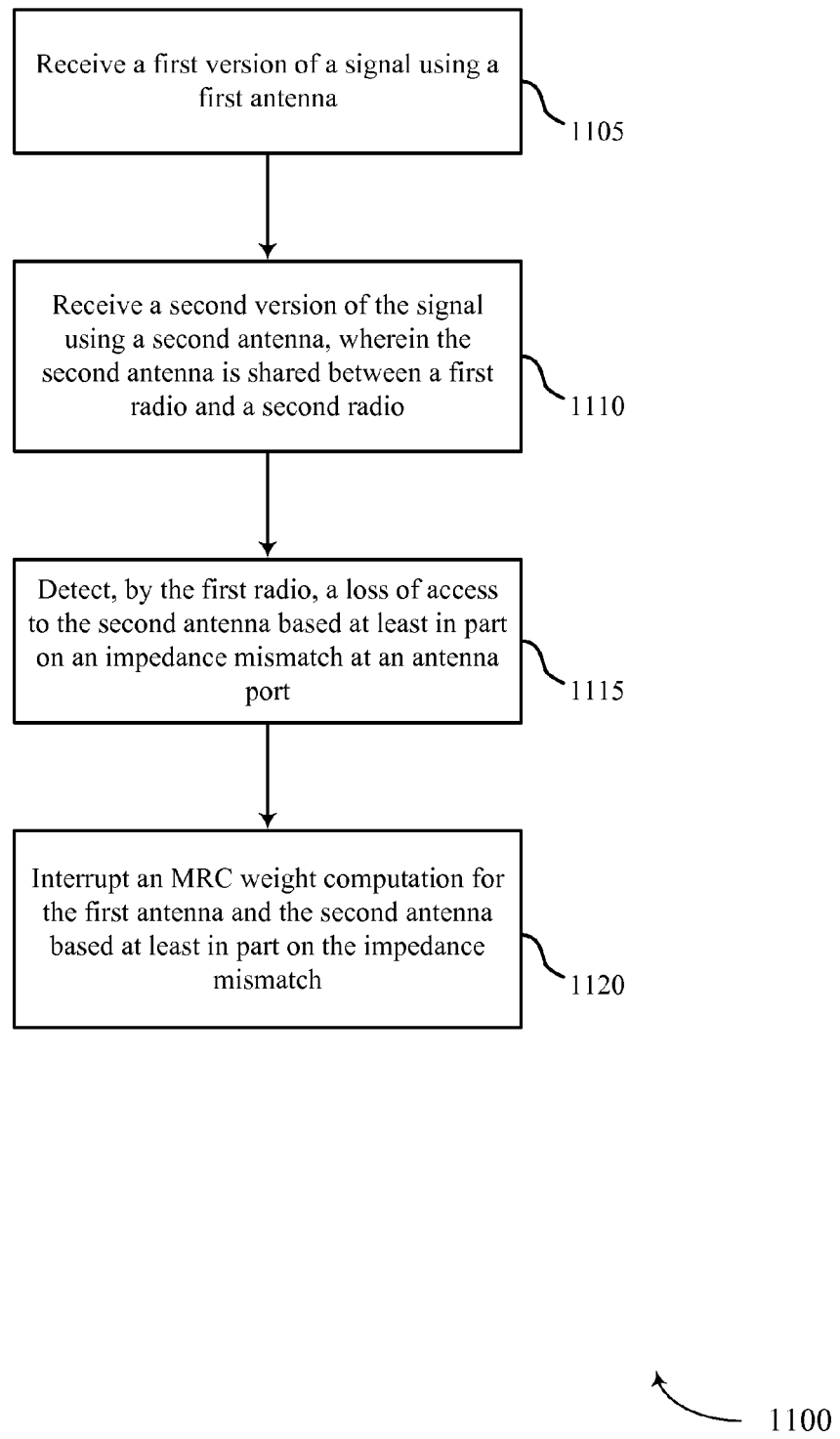
FIG. 11 illustrates a method for shared antenna loss detection and recovery in accordance with various aspects of the present disclosure.

FIG. 11 shows a flowchart illustrating a method 1100 for shared antenna loss detection and recovery in accordance with various aspects of the present disclosure. The operations of method 1100 may be implemented by a wireless communications device or its components as described with reference to FIGS. 1-9. For example, the operations of method 1100 may be performed by the shared antenna manager 610 as described with reference to FIGS. 6-9. In certain cases, the wireless communications device may be a STA 115. In some examples, a wireless communications device may execute a set of codes to control the functional elements of the wireless communications device to perform the functions described below. Additionally or alternatively, the wireless communications device may perform aspects the functions described below using special-purpose hardware. The method 1100 may also incorporate aspects of method 1000 of FIG. 10.

At block 1105, the wireless communications device may receive a first version of a signal using a first antenna as described herein with reference to FIGS. 2-5. In certain examples, the operations of block 1105 may be performed by the antenna measurement manager 705 as described herein with reference to FIG. 7.

At block 1110, the wireless communications device may receive a second version of the signal using a second antenna, wherein the second antenna is shared between a first radio and a second radio as described herein with reference to FIGS. 2-5. In certain examples, the operations of block 1110 may be performed by the antenna measurement manager 705 as described herein with reference to FIG. 7.

At block 1115, the wireless communications device may detect, by the first radio, a loss of access to the second antenna based at least in part on an impedance mismatch detected at an antenna port associated with the second antenna. Alternatively, the loss of access to the second antenna may be detected by a different hardware event, such as a change in an antenna switch control as described herein with reference to FIGS. 2-5. In certain examples, the operations of block 1115 may be performed by the hardware event monitor 710 as described herein with reference to FIG. 7.

At block 1120, the wireless communications device may interrupt an MRC weight computation for the first antenna and the second antenna based at least in part on the detected impedance mismatch (or other hardware event) as described herein with reference to FIGS. 2-5. In certain examples, the operations of block 1120 may be performed by the receive-side processing manager 715 as described herein with reference to FIG. 7.

Figure 12:
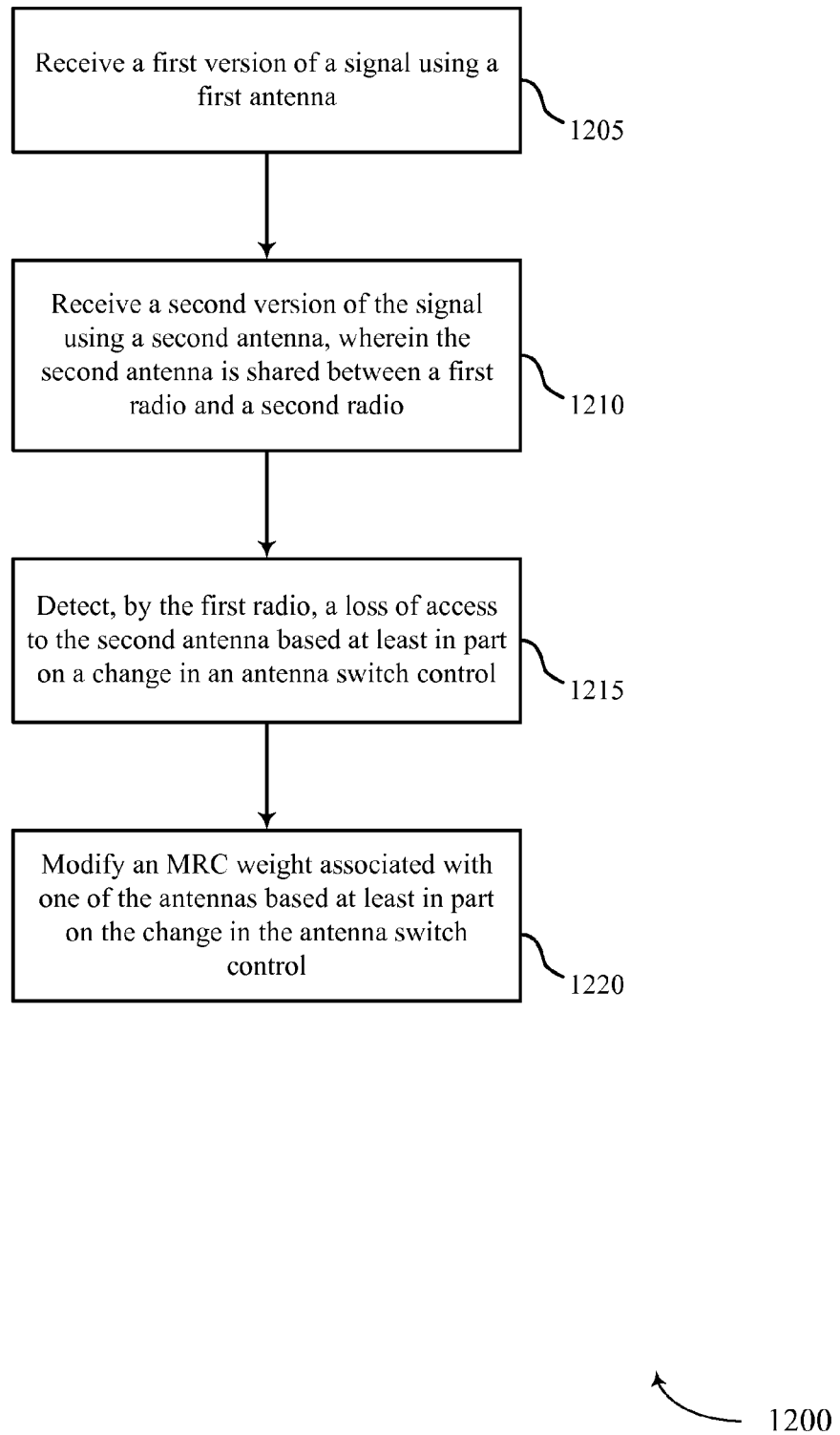
FIG. 12 illustrates a method for shared antenna loss detection and recovery in accordance with various aspects of the present disclosure.

FIG. 12 shows a flowchart illustrating a method 1200 for shared antenna loss detection and recovery in accordance with various aspects of the present disclosure. The operations of method 1200 may be implemented by a wireless communications device or its components as described with reference to FIGS. 1-9. For example, the operations of method 1200 may be performed by the shared antenna manager 610 as described with reference to FIGS. 6-9. In certain cases, the wireless communications device may be a STA 115. In some examples, a wireless communications device may execute a set of codes to control the functional elements of the wireless communications device to perform the functions described below. Additionally or alternatively, the wireless communications device may perform aspects the functions described below using special-purpose hardware. The method 1200 may also incorporate aspects of methods 1000, and 1100 of FIGS. 10-11.

At block 1205, the wireless communications device may receive a first version of a signal using a first antenna as described herein with reference to FIGS. 2-5. In certain examples, the operations of block 1205 may be performed by the antenna measurement manager 705 as described herein with reference to FIG. 7.

At block 1210, the wireless communications device may receive a second version of the signal using a second antenna, wherein the second antenna is shared between a first radio and a second radio as described herein with reference to FIGS. 2-5. In certain examples, the operations of block 14210 may be performed by the antenna measurement manager 705 as described herein with reference to FIG. 7.

At block 1215, the wireless communications device may detect, by the first radio, a loss of access to the second antenna based at least in part on a change in an antenna switch control associated with the second antenna. Alternatively, the loss of access to the second antenna may be detected based at least in part on a different hardware event, such as an impedance mismatch as described herein with reference to FIGS. 2-5. In certain examples, the operations of block 1215 may be performed by the hardware event monitor 710 as described herein with reference to FIG. 7.

At block 1220, the wireless communications device may modify an MRC weight associated with one of the antennas based at least in part on the detected change in the antenna switch control (or other hardware event) as described herein with reference to FIGS. 2-5. In some cases, the modification may include assigning no MRC weight to the second antenna. Accordingly, the wireless communications device may refrain from using the second version of the signal during an MRC equalization of the signal. In certain examples, the operations of block 1220 may be performed by the receive-side processing manager 715 as described herein with reference to FIG. 7.

Thus, methods 1000, 1100, and 1200 may provide for shared antenna loss detection and recovery. It should be noted that methods 1000, 1100, and 1200 describe possible implementation, and that the operations and the steps may be rearranged or otherwise modified such that other implementations are possible. In some examples, aspects from two or more of the methods 1000, 1100, and 1200 may be combined.

The detailed description set forth above in connection with the appended drawings describes exemplary configurations and does not represent all the examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication at a wireless communications device, comprising:
   receiving a first version of a signal using a first antenna;
   receiving a second version of the signal using a second antenna, wherein the second antenna is shared between a first radio and a second radio;
   detecting, by the first radio, a loss of access to the second antenna based at least in part on a hardware event; and
   performing, by the first radio, receive-side processing of the first version of the signal and the second version of the signal by applying a maximal ratio combining (MRC) weight computation, wherein an MRC weight associated with one of the antennas is modified for the MRC weight computation based at least in part on the loss of access to the second antenna.

2. The method of claim 1, wherein detecting the loss of access to the second antenna comprises:
   detecting an impedance mismatch associated with the second antenna.

3. The method of claim 1, wherein detecting the loss of access to the second antenna comprises:
   detecting a change in an antenna switch control associated with the second antenna.

4. The method of claim 1, wherein performing the receive-side processing comprises:
   interrupting a maximal ratio combining (MRC) weight computation.

5. The method of claim 1, wherein modifying the MRC weight associated with one of the antennas comprises assigning no MRC weight to the second antenna, the method further comprising:
   refraining from using the second version of the signal during an MRC equalization of the signal.

6. The method of claim 1, wherein performing the receive-side processing comprises:
   using a stored MRC weight associated with a previously completed MRC weight computation in connection with the first version of the signal or the second version of the signal during an MRC equalization of the signal.

7. The method of claim 6, wherein the previously completed MRC weight computation is completed prior to the loss of access to the second antenna.

8. The method of claim 6, further comprising:
   determining whether an elapsed amount of time since a most recently completed MRC weight computation or a channel condition satisfies a threshold;
   wherein the use of the stored MRC weight is based at least in part on the determination.

9. The method of claim 6, wherein performing the receive-side processing comprises:
   determining a first channel weight for the first antenna based at least in part on instantaneous measurements at the first antenna;
   the method further comprising performing the MRC equalization of the signal using the first channel weight for the first version of the signal and the stored channel weight from the previously completed MRC weight computation for the second version of the signal.

10. The method of claim 1, further comprising:
    measuring a signal strength of at least one of the versions of the signal;
    wherein performing the receive-side processing is based at least in part on the measured signal strength.

11. The method of claim 1, wherein the loss of access to the second antenna occurs during a receive operation of the first radio using the first and second antennas.

12. An apparatus for wireless communication, comprising:
    an antenna measurement manager for receiving a first version of a signal using a first antenna;
    an antenna measurement manager for receiving a second version of the signal using a second antenna, wherein the second antenna is shared between a first radio and a second radio;
    a hardware event monitor for detecting, by the first radio, a loss of access to the second antenna based at least in part on a hardware event; and
    a receive-side processing manager for performing, by the first radio, receive-side processing of the first version of the signal and the second version of the signal by applying a maximal ratio combining (MRC) weight computation, wherein an MRC weight associated with one of the antennas is modified for the MRC weight computation based at least in part on the loss of access to the second antenna.

13. The apparatus of claim 12, wherein the hardware event monitor detects the loss of access to the second antenna by:
   detecting an impedance mismatch associated with the second antenna.

14. The apparatus of claim 12, wherein the hardware event monitor detects the loss of access to the second antenna by:
   detecting a change in an antenna switch control associated with the second antenna.

15. The apparatus of claim 12, wherein the receive-side processing manager modifies the receive-side processing by:
   interrupting a maximal ratio combining (MRC) weight computation for the first antenna and the second antenna.

16. The apparatus of claim 12, further comprising:
   an MRC weight selector for modifying the MRC weight associated with one of the antennas by:
   assigning no MRC weight to the second antenna, the method further comprising:
   refraining from using the second version of the signal during an MRC equalization of the signal.

17. The apparatus of claim 12, wherein the receive-side processing manager performs the receive-side processing by:
   using a stored MRC weight associated with a previously completed MRC weight computation in connection with the first version of the signal or the second version of the signal during an MRC equalization of the signal.

18. The apparatus of claim 17, further comprising:
   determining a first channel weight for the first antenna based at least in part on instantaneous measurements at the first antenna;
   the apparatus further comprising an MRC weight selector for performing the MRC equalization of the signal using the first channel weight for the first version of the signal and the stored channel weight from the previously completed MRC weight computation for the second version of the signal.

19. An apparatus for wireless communication, comprising:
   means for receiving a first version of a signal using a first antenna;
   means for receiving a second version of the signal using a second antenna, wherein the second antenna is shared between a first radio and a second radio;
   means for detecting, by the first radio, a loss of access to the second antenna based at least in part on a hardware event; and
   means for performing, by the first radio, receive-side processing of the first version of the signal and the second version of the signal by applying a maximal ratio combining (MRC) weight computation, wherein an MRC weight associated with one of the antennas is modified for the MRC weight computation based at least in part on the loss of access to the second antenna.

20. The apparatus of claim 19, wherein the means for detecting the loss of access to the second antenna further comprises:
   means for detecting an impedance mismatch associated with the second antenna.

21. The apparatus of claim 19, wherein the means for detecting the loss of access to the second antenna further comprises:
   means for detecting a change in an antenna switch control associated with the second antenna.

22. The apparatus of claim 19, wherein the means for modifying the receive-side processing further comprises:
   means for interrupting a maximal ratio combining (MRC) weight computation for the first antenna and the second antenna.

23. The apparatus of claim 19, further comprising:
   means for assigning no MRC weight to the second antenna; and
   means for refraining from using the second version of the signal during an MRC equalization of the signal.

24. The apparatus of claim 19, wherein the means for performing the receive-side processing comprises:
   means for using a stored MRC weight associated with a previously completed MRC weight computation in connection with the first version of the signal or the second version of the signal during an MRC equalization of the signal.

25. The apparatus of claim 24, wherein the means for performing the receive-side processing further comprises:
   means for determining a first channel weight for the first antenna based at least in part on instantaneous measurements at the first antenna; and
   means for performing the MRC equalization of the signal using the first channel weight for the first version of the signal and the stored channel weight from the previously completed MRC weight computation for the second version of the signal.

26. A non-transitory computer-readable medium storing code for communication at a wireless device, the code comprising instructions executable by a processor to cause the wireless device to:
   receive a first version of a signal using a first antenna;
   receive a second version of the signal using a second antenna, wherein the second antenna is shared between a first radio and a second radio;
   detect, by the first radio, a loss of access to the second antenna based at least in part on a hardware event; and
   perform, by the first radio, receive-side processing of the first version of the signal and the second version of the signal by applying a maximal ratio combining (MRC) weight computation, wherein an MRC weight associated with one of the antennas is modified for the MRC weight computation based at least in part on the loss of access to the second antenna.

27. The non-transitory computer-readable medium of claim 26, wherein the instructions to detect the loss of access to the second antenna further comprise:
   instructions executable by the processor to cause the wireless device to detect an impedance mismatch associated with the second antenna.

* * * * *